Patented Apr. 30, 1940

2,199,043

UNITED STATES PATENT OFFICE 2,199,043

ACID AZO DYESTUFFS AND THEIR MANUFACTURE

Achille Conzetti, Basel, Switzerland, assignor to the firm J. R. Geigy A. G., Basel, Switzerland No Drawing. Application October 21, 1938, Serial No. 236,317. In Switzerland October 27, 1937

5 Claims. (Cl. 260—162)

This invention relates to the manufacture of acid azo dyestuffs and has for its object the production of such dyestuffs having valuable properties, and which are especially suitable for dyeing wool and silk.

According to this invention acid azo dyestuffs are made by coupling diazotized mono-amino di- or tri-phenyl mono- or di-ether sulphonic acids with chlorinated phenylmethylpyrazolones.

Yellow dyestuffs are formed, the wool and silk dyeings of which are characterized by a pure shade, very good fastness to light, very good fastness to alkaline and acid fulling and especially good fastness to sea water. The dyestuffs also have a very good neutral drawing power.

The following examples, without being limitative, illustrate the present invention:

Example 1

29.3 kg. of 3':5'-dimethyl-2-aminodiphenyl-ether-4-sulphonic acid are dissolved in 300 liters of water with the necessary quantity of soda, 7 kg. of nitrite are added and the solution is allowed to run at 0° C. into 30 liters of concentrated hydrochloric acid. The suspension of the diazo compound is gradually added to an ice-cold solution of 21.5 kg. of m-chlorophenylmethylpyrazolone containing 30 kg. of anhydrous soda. The coupling is quickly completed, the whole is heated and the dyestuff is salted out. After working up as usual it constitutes a yellow powder the pure yellow dyeings of which are characterized by a very good fastness to alkaline and acid fulling and fastness to sea water.

Example 2

35.7 kg. of 4'-phenoxy-2-aminodiphenylether-4-sulphonic acid are, as indicated in Example 1, indirectly diazotized and allowed to run into a solution of 25 kg. of 3:4-dichlorophenylmethylpyrazolone containing 30 kg. of anhydrous soda. The dyestuff prepared as usual produces clear yellow color shades; the dyeings are characterized by a very good fastness to sea water, alkaline and acid fulling. The dyestuff possesses particularly good neutral drawing properties.

Example 3

27.9 kg. of 2'-methyl-2-aminodiphenylether-4-sulphonic acid are diazotized according to the process in Example 1, and the diazo suspension is allowed to run into a solution of 28 kg. of 3:4:5-trichlorophenylmethylpyrazolone containing 30 kg. of anhydrous soda. Isolated in the usual manner, the dyestuff, a yellow powder, dyes wool a beautiful greenish, clear yellow. The dyeings possess an excellent fastness to acid and alkaline fulling and a very good fastness to sea water; the dyestuff draws excellently from the neutral bath.

Instead of the diazo compounds indicated in the above three examples, which obviously may be changed for one another, the following for example may also be used: the diazo compounds of 4'-chloro-2-amino-diphenylether-4-sulphonic acid, of 2':4'-dichloro-6'-methyl-2-aminodiphenylether-4-sulphonic acid, of 4'-isoamyl-2-aminodiphenylether-4-sulphonic acid, of 4'-phenyl-2-aminodiphenylether-4-sulphonic acid, and of 4'-phenylazo - 2 - aminodiphenylether -4 - sulphonic acid. There may also be used with advantage those amino di- or tri-phenylethersulphonic acids which are obtained by the condensation of p-nitrochlorobenzenesulphonic acids with the corresponding aromatic hydroxy compounds and subsequent reduction, for example 2'- methyl- 4 -aminodiphenylether - 2 - sulphonic acid,
4'-phenoxy-4-aminodiphenylether - 2 - sulphonic acid,
4'-(2'':4''-dichloro-6''-methyl)-phenoxy-4-aminodiphenylether-2-sulphonic acid,
4'-isoamyl- 4 -aminodiphenylether - 2 - sulphonic acid.

Amongst the pyrazolones, it is possible, in addition to those mentioned in the above examples, to use for example the pyrazolones produced from 2:4- or 3:5-dichloro- or 2:4:5-trichloroaniline. Chlorinated pyrazolone carboxylic acids or esters thereof lead to dyestuffs with similar properties.

What I claim is:

1. Monoazo dyestuffs, having in the free state the following general formula

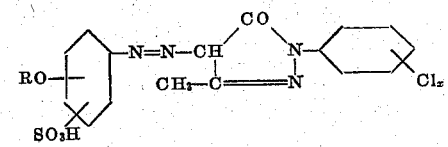

wherein R means an aromatic radical of the benzene series and $x$ an integer from 1 to 3, being yellow powders dyeing wool and silk pure yellow shades having a very good fastness to light, to alkaline and acid fulling and especially a good fastness to sea water.

2. Monoazo dyestuffs, having in the free state the following general formula

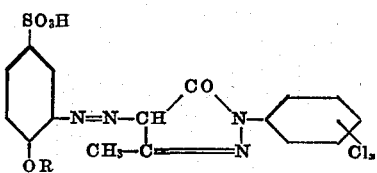

wherein R means an aromatic radical of the benzene series and $x$ an integer from 1 to 3, being yellow powders dyeing wool and silk pure yellow shades of very good fastness to light, to alkaline and acid fulling and especially of good fastness to sea water.

3. The monoazo dyestuffs of the following formula

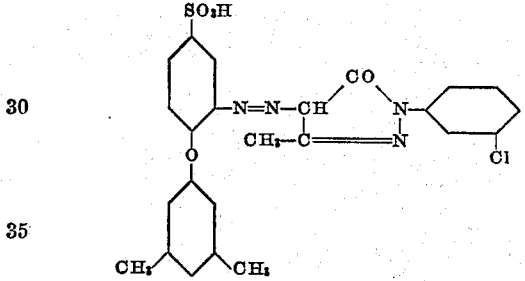

being a yellow powder dyeing wool and silk pure yellow shades of very good fastness to alkaline and acid fulling and of good fastness to seawater.

4. The monoazo dyestuff of the following formula

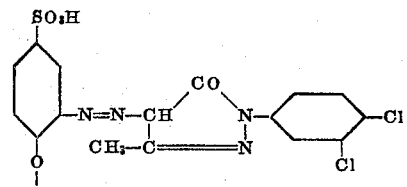

being a yellow powder dyeing wool and silk clear yellow shades of very good fastness to sea water, alkaline and acid fulling.

5. The monoazo dyestuff of the following formula

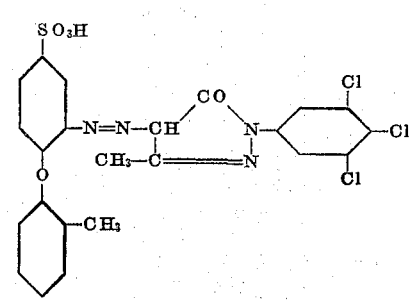

being a yellow powder, dyeing wool and silk a beautiful greenish, clear yellow of excellent fastness to acid and alkaline fulling and of very good fastness to sea water.

ACHILLE CONZETTI.